June 5, 1928.
E. H. TENNEY
CLUTCH
Filed April 1, 1926
1,672,582
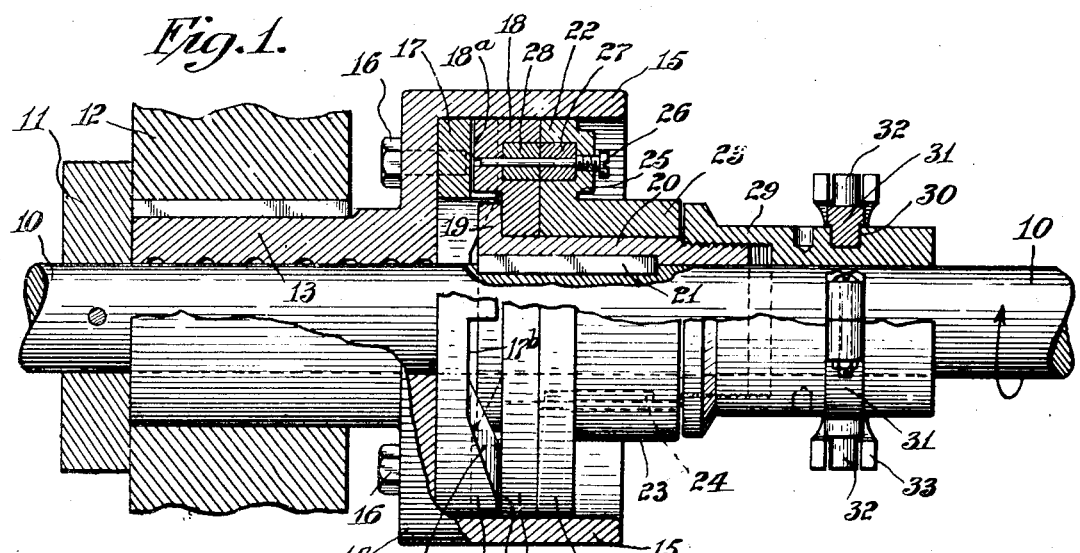
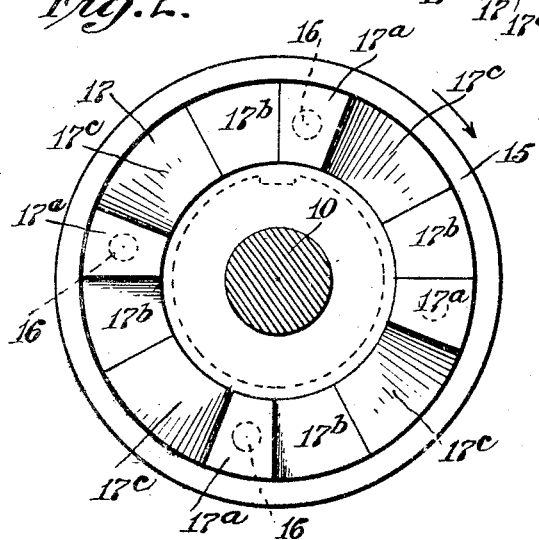
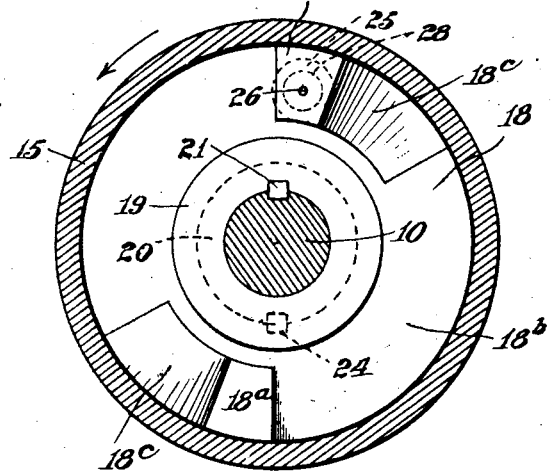
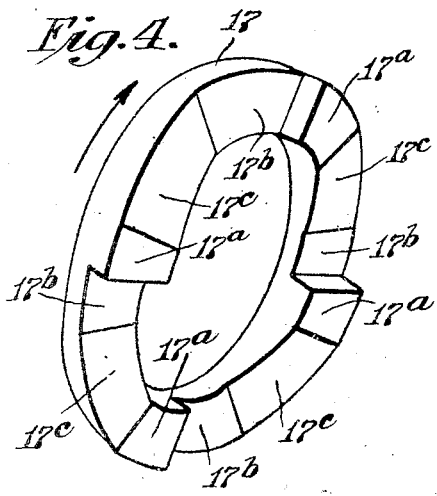
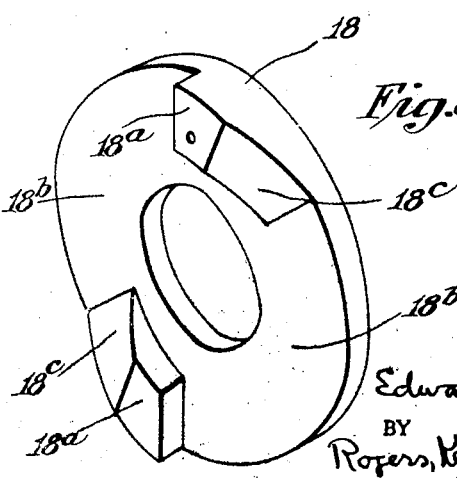
INVENTOR
Edward H. Tenney
BY
Rogers, Kennedy & Campbell
ATTORNEYS.

Patented June 5, 1928.

UNITED STATES PATENT OFFICE.

EDWARD H. TENNEY, OF WEBSTER GROVES, MISSOURI.

CLUTCH.

Application filed April 1, 1926. Serial No. 99,005.

This invention is a novel clutch, particularly a clutch for the mechanical transmission of power and which is adapted to release upon excessive resistance or overload, preferably by the breaking of a shear pin.

The general object of the present invention is to afford a clutch of the kind referred to which will be simple and inexpensive in structure, substantially free from the need of springs, tensions or adjustments, and involving no substantial wear. A further object is to afford a clutch which yields on overload, yet gives a positive drive, through engaging dogs, when in running condition, and so obviating slippage. A further object is to permit the ready removal and renewal of the shear pin when it has been cut due to the overload, namely by a quick opening up of the whole clutch. Other objects include the prevention of shock by impact of the clutch members in an axial direction when restarting after replacement of a shear pin; and to minimize the impact or shock circumferentially when the driving dogs meet in restarting operations, thus not merely saving wear on the dogs but avoiding the accidental breakage of the shear pin in restarting. Other objects and advantages of the present invention will be explained in the following description or will be apparent to those skilled in the art.

To the attainment of such objects and advantages, the present invention consists in the novel clutch, and the novel features of construction, arrangement, combination and detail illustrated or described.

In the accompanying drawings Fig. 1 is a side elevation of a clutch embodying the present invention, the upper part of the figure being in central longitudinal section, and other parts broken away to show the interior construction.

Fig. 2 is a right elevation of the driven parts of the clutch, detached.

Fig. 3 is a left elevation of the driving parts, detached, the housing shown in cross section.

Fig. 4 is a perspective view of the driven clutch member shown in Fig. 2 and Fig. 5 is a corresponding perspective view showing the driving clutch member seen in Fig. 3.

The main driving member may consist of a shaft 10 constituting a source of power. This may be an elongated driving shaft and may operate a number of the clutches for the purpose of multiple operations or gang driving. One typical instance of the use of such clutch is in connection with the driving of stoker mechanisms, where the underfed fuel is thrust into a series of retorts by a series of rams, all operated from a single power shaft. In such case the shaft may be provided with one of the present clutches for each of the feeding rams, the clutches operating at relatively high speed through a gear box which reduces the speed as may be required for the slow moving ram. A similar typical instance is in connection with the feeding of pulverized coal by fast rotating feed screws to a series of burners underneath the boilers. In either of these cases if the ram or the feed screw should be blocked by clogging of fuel or otherwise it is important that the clutch should yield to relieve the drive and avoid breakage, and this is done without stopping the rotation of the power shaft or interfering with the actuation of the remaining feed rams or feed screws. It is further important, in such systems, to avoid having to shut down the drive for any length of time while the shear pin is being renewed, and it will be seen that the present invention permits the entire clutch mechanism to be opened out and both parts of the shear pin removed and the clutch readjusted, without the need of stopping the shaft or at most calling for a momentary stoppage as the clutch is reengaged. By using a clutch having normally a positive or dog drive, slippage is prevented, which otherwise would result in uneven fuel feed at the several infeed points, and inferior combustion control due to uneven distribution of fuel.

At the left end of the driving shaft 10 is shown a positioning collar 11 pinned to the shaft and serving to position thereon a gear 12 and a sleeve 13 to which the gear is keyed, the sleeve and gear being loose on the shaft 10 and suitably geared or connected to drive the ram, feed screw or other device. The driven sleeve 13 is shown formed with an outwardly extending flange 14, the outer rim of which is extended axially as a shell or housing 15 enclosing the clutch parts. The housing 15 may form a fairly close or running fit with the rotary inner parts, as shown, so as to exclude dust or a felt washer may be inserted for this purpose. It is an advantage of the invention that the clutch parts can be thus protected from dust.

By means of bolts 16 the driven clutch member or disk or ring 17 is secured to the flange 14. This is an annular member provided with lugs or dogs as will be further described in connection with Figs. 2 and 4.

Facing the driven clutch member 17 is the driving clutch member 18 consisting also of an annular disk as shown more in detail in Figs. 3 and 5. The inner edge of the driving clutch member 18 is engaged by a flange 19 formed on a sleeve 20, which is directly surrounded by the clutch member. The sleeve 20 is mounted on the shaft 10 by means of a key 21 in such manner that the sleeve is compelled to rotate with the shaft but may slide freely axially thereon. To the right of the driving clutch member is the flange 22 of a collar 23 which is connected to the sleeve 20 by a key 24, so that the shaft, the sleeve and the collar rotate together as driving parts of the clutch. The driving clutch member 18 normally rotates with the described parts and may be connected as follows. The right side of the flange 22 of the collar 23 is formed with a boss 25 which is bored out to receive the threaded shank of a shear pin 26, the pin extending through the flange 22 and substantially through the driving clutch member 18, but not engaging any driven member. The parts 22 and 18 may be constructed of cast iron, and in order to give a superior shearing effect, and prevent wear, each of them is bored out to receive a steel bushing surrounding the shear pin. Thus a bushing 27 is shown in the flange 22 and a bushing 28 in the clutch disk 18, the meeting faces of the two bushings coinciding with the meeting faces of the flange and disk. Upon excessive resistance in the driven parts the bushing 27 may be forced beyond the bushing 28 and thus shear the pin 26, which may be composed of brass, or in some cases soft steel.

The right end of the sleeve 20 is shown as formed with a shoulder and beyond that a threaded portion. A threaded extension sleeve or nut 29 is shown engaged with the threads of sleeve 20, the nut 29 being of such diameter as to overlap the right end of the collar 23, and the nut being in contact with the shoulder of the sleeve 20 and held there by the binding action of the screw threads. Thus the driving clutch member and collar 23 are confined between the flange 19 of the main sleeve 20 and the left extremity of the extension sleeve 29. A slight clearance should be provided and a somewhat exaggerated clearance appears between the elements 23 and 29, precluding possible frictional drive between the elements 18 and 23 in case the shear pin is broken. The driving parts surrounding the shaft 10 may be shifted bodily axially by movement of the extension sleeve or nut 29. For this purpose it is shown formed with a groove 30 in which is fitted a ring 31 having opposite outstanding pins 32 engaged by a shifting yoke 33. The yoke may be arranged to have two normal positions, first with the clutch closed, as shown, and second, moved slightly to the right, to open the clutch, but with the capability, after the breakage of a shear pin, of shifting axially the driving members far to the right so as to remove them wholly from the housing 15; although in some cases this relative separating movement between the driving and driven parts might be done by axial retraction of the driven parts. It will be observed that all of the driving parts, including the two members containing the broken portions of the shear pin are separated as a unit from the driven parts. The elements 18 and 22, being confined between flange 19 and nut 29 are kept in their normal axial relation. The withdrawing movement may be to such an extent as to disengage the axially moving driving parts from the key 21, so that rotation thereof will cease and permit the ready removal of the parts of the shear pin and the replacement thereof. It is believed to be novel to locate a shear pin between a driving clutch member and the driving member from which it receives its motion.

The driving clutch member 18 is shown separately in Figs. 3 and 5. It has two opposite driving dogs or lugs $18^a$, which may be referred to as the high portions of the clutch disk. The forward or driving side of each dog $18^a$ is formed with an abrupt radial face so as to afford a positive drive when the clutch is in operation. Beyond this face is the lower portion $18^b$ of the disk. At the rear side of each dog is shown a gradual or slanting approach $18^c$. This insures that the complementary dogs of the driven member will not pass abruptly with impact from the high portion $18^a$ of the driving clutch to the low portion $18^b$. The dogs thereby move easily into engaging relation.

The driven clutch member or disk 17 has also high portions $17^a$, low portions $17^b$ and slanting approaches $17^c$; but according to one feature hereof the driven clutch member is formed with a greater number of dogs than the driving member, namely a multiple thereof, for example four, as seen in Figs. 2 and 4. Owing to this there are four different positions in which the clutch members may effectively engage. This is of advantage in that the maximum rotation of the driving clutch member, while the two are coming into engagement, will be 90° between the time the dogs reach engaging position and the actual impact of the faces thereof. Owing to this, when putting the clutch into operation, or starting up power, the positive driving engagement takes place almost immediately, and before substantial speed is attained. When only two clutch dogs are provided on each clutch member it is found that the parts will attain such speed of rotation before the engaging impact of the dogs as not merely to injure the driving faces of the dogs but to bring about the cutting of the shear pin, owing to the inertia of the train of mechanism operated by the driven clutch member.

The described clutch is reversible in action. That is to say the driving and driven parts may be reversed. For this it is only necessary to remove the key 21 which keys the driving parts to the shaft 10 and instead to key to the shaft the sleeve 13, the shaft then being assumed to rotate in the opposite direction, and the transmitting gear 12 shifted to the extension sleeve 29. With this arrangement the shear pin 26 and the annular members 18 and 22 through which it extends constitute driven members of the clutch. On the breakage of the shear pin the driven members are simply shifted axially to the right. The rotation of all of them will have ceased excepting alone the clutch disk 18, still being turned by the clutch disk 17. As soon as the driven parts are axially extracted this disengages the dogs and the clutch part 18 ceases rotation. The workman then at his leisure can extract the portions of the shear pin from the non-rotating members 18 and 22, insert a new shear pin, and shift the driven clutch parts back into operative position, the driving parts in the meanwhile maintaining their rotation. By this arrangement there is no need of reengaging the sleeve 20 with the shaft key 21 as in the first described arrangement.

It will thus be seen that there has been described a clutch which embodies the principles and attains the objects of the present invention. Since various matters of combination, arrangement, structure and detail may be variously modified without departing from the principles involved it is not intend to limit the invention to such matters except so far as specified in the appended claims.

What is claimed is:

1. In combination with rotary driving and driven members an intermediate clutch, consisting of positively engageable and disengageable driving and driven clutch members, a rotary part adjacent one of said clutch members and keyed to the corresponding rotary member for axial sliding thereon, a frangible element between said rotary part and said clutch member, and means operative after breakage of said element by overload for axially shifting said clutch member and adjacent rotary part out of key engagement with the rotary member.

2. In combination with rotary driving and driven members an intermediate clutch, consisting of positively engageable and disengageable driving and driven clutch members, a rotary part adjacent the driving clutch member and keyed to the driving member for axial sliding thereon, a frangible element between said rotary part and driving clutch member, and means operative after breakage of said element by overload for axially shifting said driving clutch member and adjacent rotary part out of key engagement with the driving member, whereby said parts are freed from rotation and permit replacement of the frangible element.

3. In combination, a driving shaft, a driven member having clutch projections, a driving clutch member having projections positively engageable with and disengageable from the driven member clutch projections, a rotary part adjacent the driving clutch member and operatively engaged with the driving shaft but adapted to be disengaged by shifting thereon, a shear element connecting said rotary part and driving clutch member, and means for shifting said rotary part and driving clutch member to engage and disengage the clutch or to disengage said rotary part from the driving shaft upon breakage of said shear element, to release said parts from rotation and permit restoration of the broken shear element.

4. A clutch comprising complementary positive-drive clutch members, a rotary part adjacent one of said members, a breakable element connecting said rotary part and adjacent clutch member, and an enclosing housing connected with the other clutch member, and having a running fit with the first clutch member, and means for shifting said rotary part and adjacent clutch member relatively away from the other clutch member to disengage the positive drive and withdraw said part and member from said housing.

5. In combination with rotary driving and driven members, a positive clutch member connected to each rotary member, one of said clutch members being annular and connected to its rotary member as follows: a sleeve surrounds the rotary member and is keyed to slide axially thereon while rotating with it, said sleeve having a flange at its inner end confining the annular clutch member, a collar surrounding and keyed to the sleeve adjacent to the clutch member, a frangible connection between the clutch member and collar, means engaging the sleeve to confine the collar and clutch member thereon, and means for bodily shifting axially the sleeve and surrounding elements.

In testimony whereof, I have affixed my signature hereto.

EDWARD H. TENNEY.